A. A. STROM.
Assignor to the STROM MANUFACTURING COMPANY.
RAILWAY SWITCH.
No. 11,261. Reissued Aug. 16, 1892.
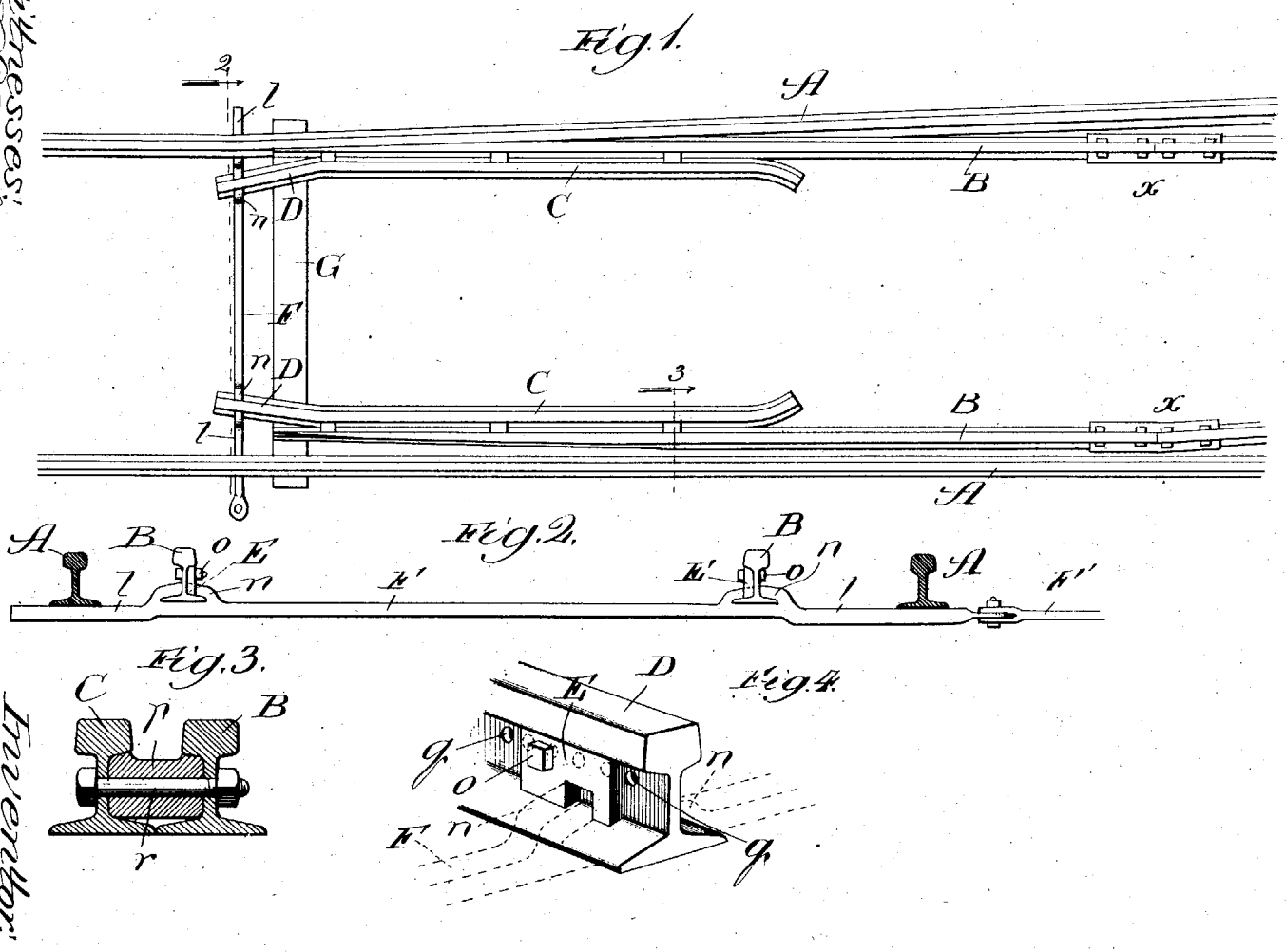
Witnesses:
Chas. E. Sanford.
Clifford White.
Inventor:
Axel A. Strom.
By Dyerupit & Dyerupit
Att'ys.

UNITED STATES PATENT OFFICE.

AXEL A. STROM, OF AUSTIN, ASSIGNOR TO THE STROM MANUFACTURING COMPANY, OF CHICAGO, ILLINOIS.

RAILWAY-SWITCH.

SPECIFICATION forming part of Reissued Letters Patent No. 11,261, dated August 16, 1892.

Original No. 457,904, dated August 18, 1891. Application for reissue filed July 22, 1892. Serial No. 440,940.

*To all whom it may concern:*

Be it known that I, AXEL A. STROM, a citizen of the United States, residing at Austin, in the county of Cook and State of Illinois, have invented a new and useful Improvement in Railway-Switches, of which the following is a specification.

My invention relates to the class of railway-switches known as "split switches," being those formed with point-rails located between main rails and tied together to be simultaneously thrown laterally against one or the other of the main rails by a suitable switch-operating device.

One object of my improvement is to stiffen the point-rails lengthwise by reinforcing means applied laterally to the inner sides of the rails, but adequately spaced therefrom to prevent its acting as a guard-rail and adapted to rest on their foundation laterally of the point-rails. As to this feature of my invention, I may state that I know it to be old to reinforce the point-rails of split switches by means of T-bars fastened to the inner sides of their webs. This construction, however, not adapting the reinforcing means to rest on a foundation-plane lateral to that of the point-rails, does not serve, as does mine, to hold up the point-rails.

A common defect in split switches is that the point-rails are liable to be or become bent, and from that or some other cause to fail to meet the main rails toward which they are thrown, thereby producing liability to accident. My object in this connection is to provide a split switch having the point-rails connected by a tie-bar with a horizontal extension from the inner side of each or either point-rail or from the reinforcing means, if provided, the extensions inclining toward each other and having, preferably, elongated or longitudinal series of transverse holes, and a plate to fit against the web of each point-rail, having a bolt-hole, and to which the tie-bar is fastened. I secure the tie-bar in position by bolting the aforesaid plates to the rails at the proper points to maintain them so spread apart that the limit of their throw will be against the main rails, and to gage the throw, if disarranged from any cause or requiring readjustment, I slide the plates farther toward or from the points of the rails, as the case may require farther spreading apart or bringing together of the rails, and there bolt the plates to the extensions. Other means for effecting readily adjustment of the gage of the point-rails are shown and described in my United States Letters Patent, No. 457,905, granted August 18, 1891.

In the accompanying drawings, Figure 1 is a plan view representing a railroad-track having a split switch provided with my improvements constructed in accordance with my preference as to details. Fig. 2 is a section taken on the line 2 of Fig. 1 and viewed in the direction of the arrow. Fig. 3 is an enlarged section taken on the line 3 of Fig. 1 and viewed in the direction of the arrow. Fig. 4 is an enlarged broken view in perspective, showing in detail my improved point-rail-adjusting device.

A A are main rails in a railroad-track, and B B are the point-rails of a split switch in the track, the point-rails being fastened, respectively, at *x x*. Along the inner side of each point-rail—say for about fifteen feet (more or less) of its length—I extend a reinforcing-bar C, (preferably having the form of a guard-rail, although not acting as a guard-rail,) secured to the point-rail by bolts *r*, passed through them and through interposed spacing-blocks *p*, provided at desired intervals, and which maintain the heads of the connected rails B and C sufficiently far apart to prevent the latter acting as guard-rails and the adjacent edges of their flanges together throughout the greater portion of the length of the bar C. The ends of the reinforcing-rails C should be bent inward, as shown, whereby they are caused to resemble guard-rails. Inclining horizontally inward from the inner sides of the rails B and toward each other and preferably but not necessarily extending from the rails C and from the ends thereof to project beyond the points of the rails B are the sections D D, each provided in its web with a horizontal series of bolt-holes *q* and with a plate E, adapted to fit against the web of the rail in a manner to permit it to be readily slid back and forth, and provided with a hole for a bolt *o*.

F is the tie-bar, which may involve the construction illustrated or any other suitable construction. The tie-bar shown is provided near its opposite ends with rigid opposing jaws *n*, affording seats for the rails B, and which fit at their opposing extremities against opposite sides of the webs of the rails, a slot *m* being provided in the base of each adjusting-plate E to permit the adjacent side of the respective jaw *n* to pass through it against the web and cause the jaw to be engaged by the said plate. At opposite sides of the seats *n* the bar F is depressed, as shown at *l*, to pass under the bases of the main rails A, and one end of the bar F is pivotally connected with one end of a switch-connecting rod F′, the opposite end of which leads to a switch-stand. (Not shown.)

From the foregoing description of the construction it will be apparent that the reinforcing-bars C, though resembling guard-rails, are in no sense guard-rails, but, in addition to their function of stiffening and straightening (if bent) the point-rails, hold up the points, owing, practially, to the expansion they afford of the bases of the switch-rails, and that the gage of the rails B may be readily adjusted by securing the plates E at proper holes *q* or places on the sections D, (whether the latter be on reinforcing-rails C or at any suitable point on the switch-rails,) according to whether the effect to be produced be that of spreading the rails apart or bringing them closer together.

I realize that if only one of the inclined sections D were provided the adjustment would be effective, and I therefore desire to be understood as including said construction as within the meaning of my claim.

What I claim as new, and desire to secure by Letters Patent, is—

1. In a split switch, the combination, with the point-rails, of reinforcing-bars secured to and extending along their inner sides and having their bearing-bases laterally beyond those of the point-rails, substantially as and for the purpose set forth.

2. In a split switch, the combination, with the point-rails, of gage-adjusting horizontally-inward-projecting sections inclining inward from the point-rails and a tie-bar connecting the point-rails at and adjustable on the said sections lengthwise thereof, substantially as and for the purpose set forth.

3. In a split switch, the combination, with the point-rails, of gage-adjusting horizontally-inward-projecting sections inclining toward each other from the point-rails and provided with bolt-holes, perforated plates fitting against the sides of the said sections and bolted thereto, and a tie-bar connecting the point-rails at the said sections and held by the said plates, substantially as and for the purpose set forth.

4. In a split switch, the combination, with the point-rails, of guard-rail-shaped reinforcing-rails bolted to and extending along the inner sides of the point-rails and spacers interposed between the point-rails and reinforcing-rails, substantially as and for the purpose set forth.

5. In a split switch, the combination, with the point-rails, of reinforcing-bars secured to the inner sides of said rails and extending beyond the points thereof and a tie-bar connecting the point-rails at the said extensions, substantially as described.

6. In a split switch, the combination, with the point-rails B, of guard-rail-shaped reinforcing-rails C, bolted to and extending along the inner sides and beyond the points of the rails B, bent sections D at the ends of the reinforcing-rails, having holes *q*, perforated plates E, bolted to the said sections through holes *q*, and a tie-bar F, connecting the point-rails at the sections D and engaged by the adjustable plates, substantially as and for the purpose set forth.

AXEL A. STROM.

In presence of—
M. J. FROST,
J. N. HANSON.